United States Patent
Chantry et al.

(10) Patent No.: US 10,300,549 B2
(45) Date of Patent: May 28, 2019

(54) INTELLIGENT WAVEFORM SELECTION FOR A WELDING SYSTEM HAVING PARTICULAR ELECTRICAL OUTPUT CHARACTERISTICS

(71) Applicant: Lincoln Global, Inc., Santa Fe Springs, CA (US)

(72) Inventors: Bruce J. Chantry, Solon, OH (US); Joseph A. Daniel, Sagamore Hills, OH (US); Todd E. Kooken, Solon, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 0 days.

(21) Appl. No.: 16/011,730

(22) Filed: Jun. 19, 2018

(65) Prior Publication Data
US 2018/0297139 A1    Oct. 18, 2018

Related U.S. Application Data

(63) Continuation of application No. 13/474,267, filed on May 17, 2012, now Pat. No. 10,071,434.

(51) Int. Cl.
*B23K 9/09* (2006.01)
*B23K 9/095* (2006.01)
*B23K 9/10* (2006.01)

(52) U.S. Cl.
CPC .............. *B23K 9/09* (2013.01); *B23K 9/0953* (2013.01); *B23K 9/0956* (2013.01); *B23K 9/10* (2013.01); *B23K 9/1056* (2013.01)

(58) Field of Classification Search
CPC .......... B23K 9/09; B23K 9/10; B23K 9/0953; B23K 9/0956; B23K 9/1043; B23K 9/1056
USPC ..................................................... 219/130.01
See application file for complete search history.

(56) References Cited

U.S. PATENT DOCUMENTS

| | | |
|---|---|---|
| 5,406,045 A | 4/1995 | Kiriishi et al. |
| 6,002,104 A | 12/1999 | Hsu |
| 6,441,342 B1 | 8/2002 | Hsu |
| 6,596,970 B2 | 7/2003 | Blankenship et al. |
| 6,710,297 B1 | 3/2004 | Artelsmair et al. |
| 6,730,875 B2 | 5/2004 | Hsu |
| 7,645,960 B2 | 1/2010 | Stava |
| 7,683,290 B2 | 3/2010 | Daniel et al. |
| 2004/0232129 A1 | 11/2004 | Houston et al. |
| 2005/0133488 A1 | 6/2005 | Blankenship et al. |
| 2005/0279819 A1 | 12/2005 | Stava |

(Continued)

FOREIGN PATENT DOCUMENTS

EP      2 444 191 A2    4/2012

*Primary Examiner* — Brian W Jennison
(74) *Attorney, Agent, or Firm* — Brad C. Spencer

(57) ABSTRACT

Systems and methods for selecting a welding output waveform based on characterizing a welding circuit output path with respect to its electrical characteristics. At least one electrical characteristic (e.g., inductance, resistance) of a welding output circuit path connected to a welding power source is determined. A welding output waveform is selected from a plurality of welding output waveforms based on the determined electrical characteristics. As a result, the selected welding output waveform is matched to the welding output circuit path electrical characteristics to provide superior welding performance.

21 Claims, 6 Drawing Sheets

(56) References Cited

U.S. PATENT DOCUMENTS

| | | |
|---|---|---|
| 2007/0056942 A1 | 3/2007 | Daniel et al. |
| 2007/0262064 A1* | 11/2007 | Daniel ................. B23K 9/0953 219/130.01 |
| 2008/0083705 A1 | 4/2008 | Peters |
| 2008/0264916 A1 | 10/2008 | Nagano et al. |
| 2009/0184098 A1 | 7/2009 | Daniel et al. |
| 2010/0065539 A1 | 3/2010 | Daniel et al. |
| 2010/0126976 A1 | 5/2010 | Kawamoto et al. |
| 2010/0288735 A1 | 11/2010 | Schmitt et al. |
| 2010/0308026 A1 | 12/2010 | Vogal |
| 2012/0097655 A1 | 4/2012 | Daniel et al. |

* cited by examiner

US 10,300,549 B2

INTELLIGENT WAVEFORM SELECTION FOR A WELDING SYSTEM HAVING PARTICULAR ELECTRICAL OUTPUT CHARACTERISTICS

CROSS-REFERENCE TO RELATED APPLICATIONS/INCORPORATION BY REFERENCE

This U.S. patent application is a continuation of pending U.S. patent application Ser. No. 13/474,267, filed on May 17, 2012, which is incorporated herein by reference in its entirety. U.S. Pat. No. 7,683,290 issued to Daniel et al. on Mar. 23, 2010 is incorporated herein by reference in its entirety. U.S. Pat. No. 6,730,875 issued to Hsu on May 4, 2004 is incorporated herein by reference in its entirety. U.S. Pat. No. 6,596,970 issued to Blankenship et al. on Jul. 22, 2003 is incorporated herein by reference in its entirety.

TECHNICAL FIELD

Certain embodiments of the present invention relate to welding. More particularly, certain embodiments of the present invention relate to systems and methods for selecting a welding output waveform in response to characterizing a welding circuit output path with respect to its electrical characteristics.

BACKGROUND

Welding power sources today use advanced power electronics principles that allow for very fast output current changes which can be significantly affected by the electrical output characteristics of the system such as, for example, inductance. As such, welding systems today are often "tuned down" to perform acceptably within typical operating scenarios. That is, the welding waveforms are often designed to accommodate the worst case scenario that is likely to be experienced by the welding system. However, the window of operation is quite wide and is affected by the length of the welding cable, the type of welding cable being used, as well as other factors. Therefore, there are times when a "tuned down" welding waveform is being used, even though the system could support a higher performing welding waveform. As such, higher welding performance is sacrificed.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

Embodiments of the present invention provide systems and methods for selecting a welding output waveform based on characterizing a welding output circuit path with respect to its electrical characteristics. At least one electrical characteristic (e.g., inductance, resistance) of a welding output circuit path connected to a welding power source is determined. A welding output waveform is selected from a plurality of welding output waveforms based on the determined electrical characteristics. The selected welding output waveform may be matched to the welding output circuit path electrical characteristics to provide superior welding performance.

One embodiment of the present invention is a method. The method includes determining at least one electrical characteristic of a welding output circuit path connected to a welding power source, and selecting a welding output waveform from a plurality of welding output waveforms based on the at least one electrical characteristic. The method may further include having the welding power source apply the selected welding output waveform to the welding output circuit path. The at least one electrical characteristic of the welding output circuit path may be an inductance value of the welding output circuit path, a resistance value of the welding output circuit path, or both.

One embodiment of the present invention is a welding power source having a welding output. The welding power source is configured to determine at least one electrical characteristic of a welding output circuit path connected to the welding output of the welding power source. The welding power source is further configured to select a welding output waveform from a plurality of welding output waveforms stored in the welding power source in response to the at least one electrical characteristic. The welding power source may also be configured to apply a selected welding output waveform to a welding output circuit path connected to the welding output of the welding power source. The welding power source may include at least one look-up-table (LUT) configured to map electrical characteristics to welding output waveforms. The at least one electrical characteristic of the welding output circuit path may be an inductance value of the welding output circuit path, a resistance value of the welding output circuit path, or both.

One embodiment of the present invention is a system. The system includes a welding power source having a welding output. The welding power source is configured to store a plurality of welding output waveforms and select one of the plurality of welding output waveforms based on at least one electrical characteristic of a welding output circuit path connected to the welding output. The system also includes a welding output circuit path operatively connected to the welding output. The welding output circuit path may include one or more of a welding cable, a welding tool and/or electrode, and a workpiece and/or workpiece connector. The welding output circuit path may run from the welding power source through the welding cable to the welding tool and/or electrode, through the workpiece and/or workpiece connector, and back through the welding cable to the welding power source. The system further includes a welding output analyzer operatively connected to one of the welding output circuit path or the welding power source. The welding output analyzer is configured to monitor welding output electrical parameters applied to the welding output circuit path by the welding power source, determine at least one electrical characteristic of the welding output circuit path based on the welding output electrical parameters, and provide the at least one electrical characteristic to the welding power source. The welding power source may include at least one look-up table (LUT) configured to map electrical characteristics to welding output waveforms. The welding output electrical parameters may include at least one regulated welding output current and a resulting welding output voltage. The welding output electrical parameters may include at least one regulated welding output voltage and a resulting welding output current. The at least one electrical characteristic of the welding circuit output path may include an inductance, a resistance, or both.

One embodiment of the present invention is a system. The system includes means for monitoring welding output electrical parameters applied to a welding output circuit path by a welding power source. The system also includes means for determining at least one electrical characteristic of the welding output circuit path based on the welding output electrical parameters. The system further includes means for selecting a welding output waveform, to be applied to the welding output circuit path by the welding power source, in response to the at least one electrical characteristic.

Details of illustrated embodiments of the present invention will be more fully understood from the following description and drawings.

DETAILED DESCRIPTION

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

The term "welding output waveform", as used herein, can mean the data or information that represents the time varying shape to be applied to welding output voltages or currents over time, and/or the actual currents or voltages applied to a welding output circuit path by a welding power source over time.

The term "welding output", as used herein, means the circuitry associated with the electrical welding output of a welding power source which is configured to be operatively connected to one or more welding cables.

The terms "welding tool", "welding electrode", and "welding wire" may be used interchangeably herein.

Figure 1:
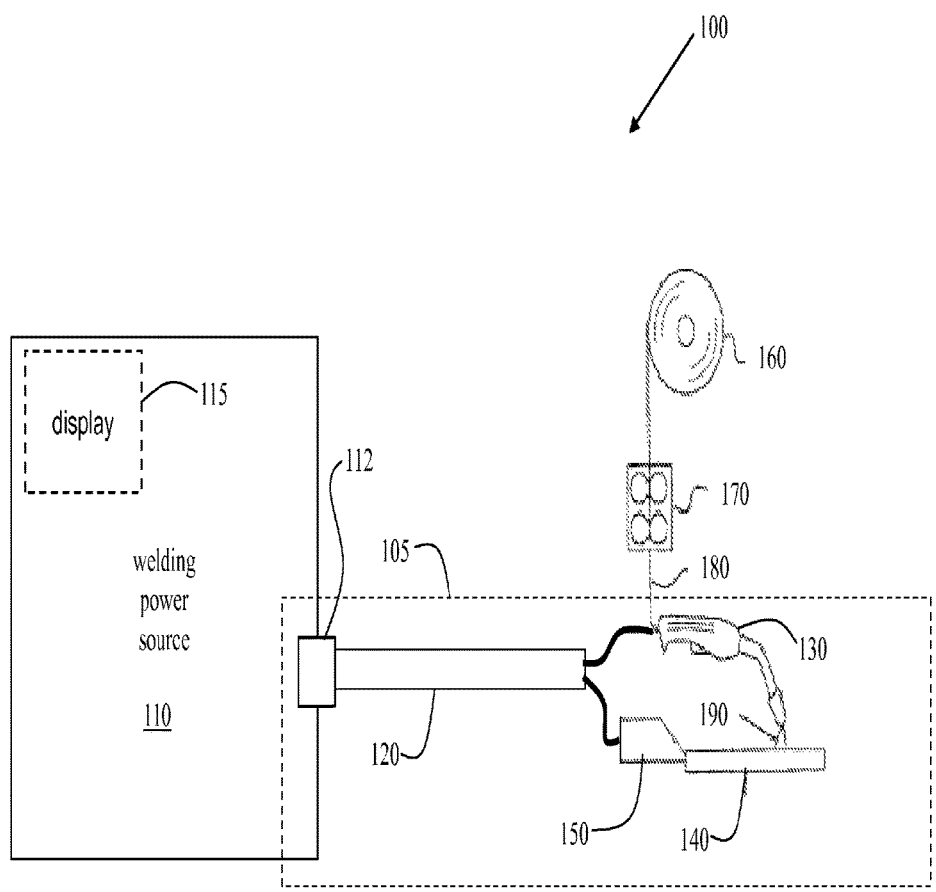
FIG. 1 illustrates a schematic block diagram of a first exemplary embodiment of a welding system including a welding output circuit path.

FIG. 1 illustrates a schematic block diagram of an exemplary embodiment of a welding system 100 including a welding output circuit path 105, in accordance with various aspects of the present invention. The welding system 100 includes a welding power source 110 having a welding output 112 and, optionally, a display 115. The welding output circuit path 105 is connected to the welding power source 110 at the welding output 112.

In accordance with an embodiment, the welding output circuit path 105 includes a welding cable 120, a welding tool 130, a workpiece connector 150, a spool of welding wire 160, a welding wire feeder 170, a welding wire 180, and an optional workpiece 140. The welding wire 180 is fed into the welding tool 130 from the spool 160 via the wire feeder 170, in accordance with an embodiment. In accordance with another embodiment, the welding system 100 does not include a spool of wire 160, a wire feeder 170, or a welding wire 180 but, instead, includes a welding tool comprising a consumable electrode such as is used in, for example, stick welding. In accordance with various embodiments of the present invention, the welding tool 130 may include at least one of a welding torch, a welding gun, an electrode holder, and a welding consumable.

The welding output circuit path 105 runs from the welding output 112 of the welding power source 110 through the welding cable 120 to the welding tool 130, through the workpiece 140 and/or to the workpiece connector 150, and back through the welding cable 120 to the welding power source 110. During operation, the welding power source 110 may apply a welding output waveform to the welding output circuit path 105, causing a time-varying electrical current to run through the welding output circuit path 105 and creating an arc between the wire (or electrode) and the workpiece 140. In accordance with an embodiment of the present invention, the welding cable 120 comprises a coaxial cable assembly. In accordance with another embodiment of the present invention, the welding cable 120 comprises a first cable length running from the welding power source 110 to the welding tool 130, and a second cable length running from the workpiece connector 150 to the welding power source 110.

In accordance with various embodiments of the present invention, the workpiece 140 may or may not be present as part of the welding output circuit path 105. If the workpiece 140 is not present, the welding tool 130 may be connected directly to the workpiece connector 150. If the workpiece 140 is present, the workpiece connector 150 may be connected between the workpiece 140 and the welding cable 120. The welding tool 130 may be directly touching the workpiece 140, or an arc 190 may be present between the welding tool 130 and the workpiece 140, for example, as during a welding operation. Also, the part of the welding wire 180 actually going through the welding tool 130 may be considered part of the welding output circuit path 105, for example, during a welding operation.

Figure 2:
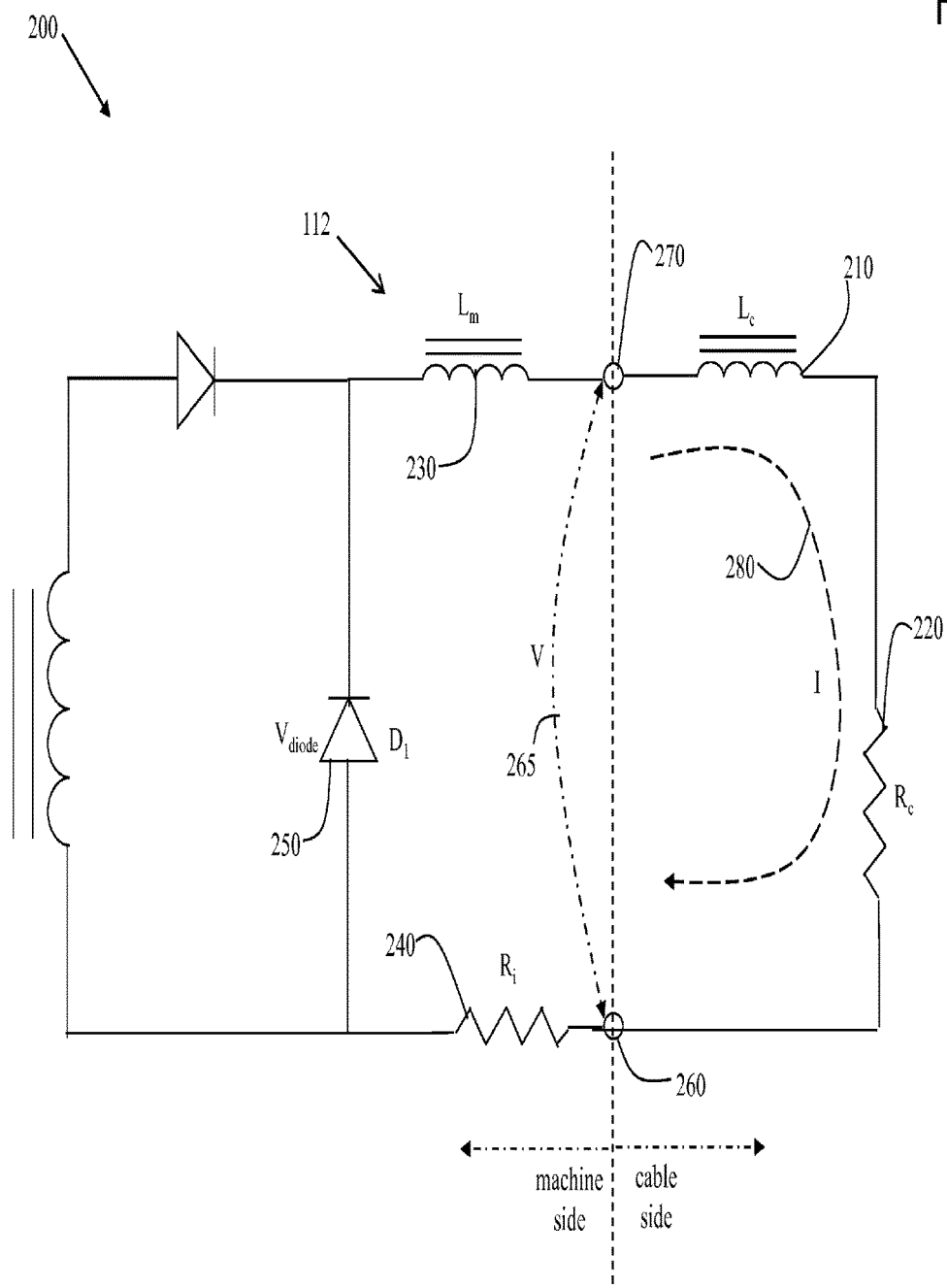
FIG. 2 is an exemplary circuit representation of the welding output circuit path of FIG. 1, in accordance with an embodiment of the present invention.

FIG. 2 is an exemplary circuit representation 200 of the welding output circuit path 105 of FIG. 1, in accordance with an embodiment of the present invention. The circuit representation 200 includes an inductance $L_c$ 210 and a resistance $R_c$ 220 of the welding cable 120 side of the welding output circuit path 105. The circuit representation 200 also includes an inductance $L_m$ 230, an internal resistance $R_i$ 240, and a diode $D_1$ 250 of the welding power source 110 side (machine side) of the welding output circuit path 105. The welding cable 120 connects to the welding power supply 110 at the welding output 112 having electrical nodes 260 and 270.

When a current (I) 280 flows through the welding output circuit path 105, an output voltage (V) 265 is produced between the nodes 260 and 270 and the resistances $R_c$ and $R_i$ and the diode $D_1$ help to dissipate energy from the inductors $L_c$ and $L_m$. In accordance with other embodiments of the present invention, other dissipating components may be present in the circuit representation 200 as well such as, for example, a switch (not shown). Such energy-dissipating components are taken into consideration when trying to accurately determine the total inductance $L_T = L_m + L_c$ of the welding output circuit path 105.

Figure 3:
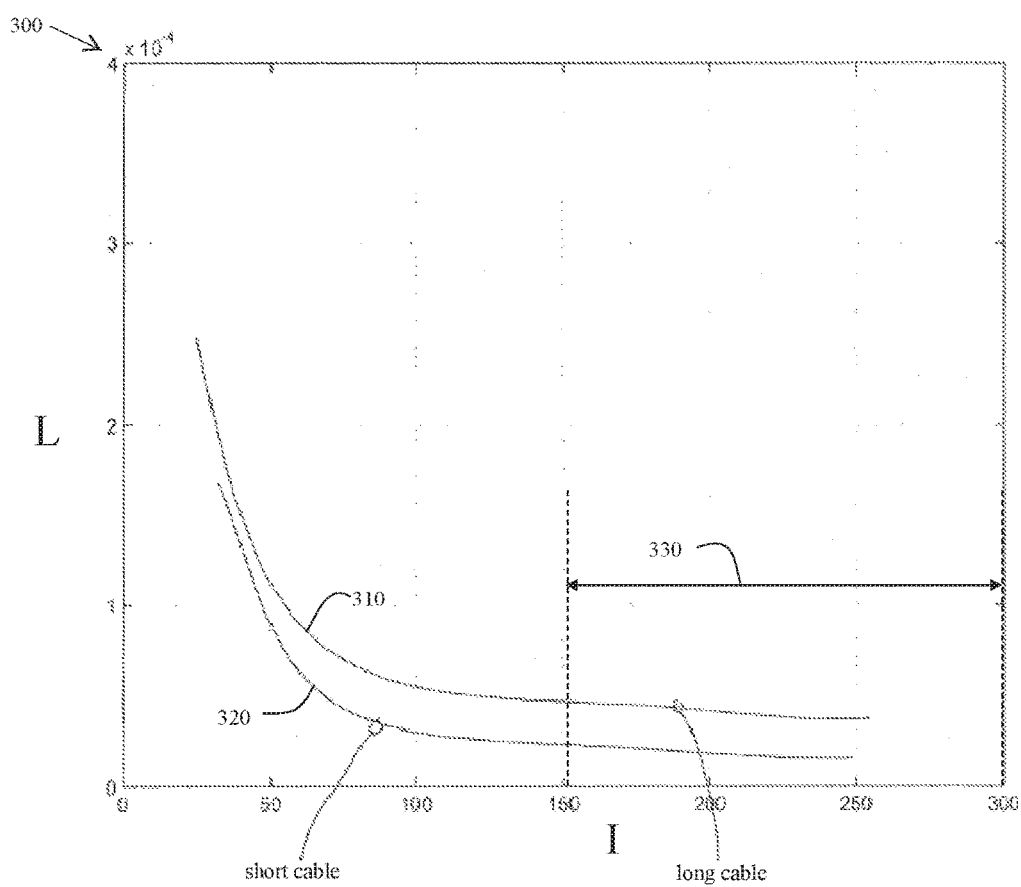
FIG. 3 is an exemplary graph showing how the total inductance $L_T$ of the welding output circuit path represented in FIG. 2 can change as a function of current I through the circuit path, in accordance with an embodiment of the present invention.

FIG. 3 is an exemplary graph 300 showing how the total inductance $L_T$ of the welding output circuit path 105 represented in FIG. 2 can change as a function of current (I) through the circuit path, in accordance with an embodiment of the present invention. A first curve 310 of inductance (L) versus current (I) is shown for a relatively long welding cable, and a second curve 320 of inductance (L) versus current (I) is shown for a relatively short welding cable. Both curves are relatively flat from about 150 amps to 300 amps as shown in the graph 300. As a result, the process of determining the total inductance $L_T$ and the total resistance $R_T$ (i.e., the electrical characteristics of the welding output circuit path) is typically conducted over the flat region 330 (e.g., between 150 and 300 amps).

U.S. Pat. No. 7,683,290, which is incorporated herein by reference, describes how the electrical characteristics (e.g., inductance and resistance) of a welding output circuit path may be determined. For example, in accordance with an embodiment of the present invention, the welding power source 110 is able to check its output circuit and determine the resistance and inductance without the use of external instruments. Measurements may be performed with the welding tool 130 short-circuited to the workpiece 140, or measurements may be performed during a welding process when an arc 190 is formed between the welding tool 130 and the workpiece 140.

In accordance with an embodiment, an inductance measurement technique is built into the welding power source 110. First, the output current is regulated to a known value while the output voltage is measured. Alternatively, the voltage may be regulated and the resulting current measured. From such current and voltage, the resistance of the welding output circuit path may be calculated as:

$$R = V/I,$$

where R is resistance, V is voltage, and I is current.

Next, the power source is turned off and the current decay is measured. Inductance is then estimated by the equation given here as:

$$L = -(R*t)/(\ln[i(t_1)/i(t_0)]),$$

where $i(t_0)$ is the current measured at time $t_0$,
$i(t_1)$ is the current measured at time $t_1$, and
$t = t_1 - t_0$.

Such an estimate of inductance L is only a rough approximation since the estimate assumes that all of the energy in the inductance is dissipated in the resistance R. However, in reality, some of the energy is being dissipated by other components as well such as, for example, diodes and switches within the welding power source. Other more accurate calculation methods are possible as well, in accordance with various other embodiments of the present invention, as described in U.S. Pat. No. 7,683,290.

Figure 4:
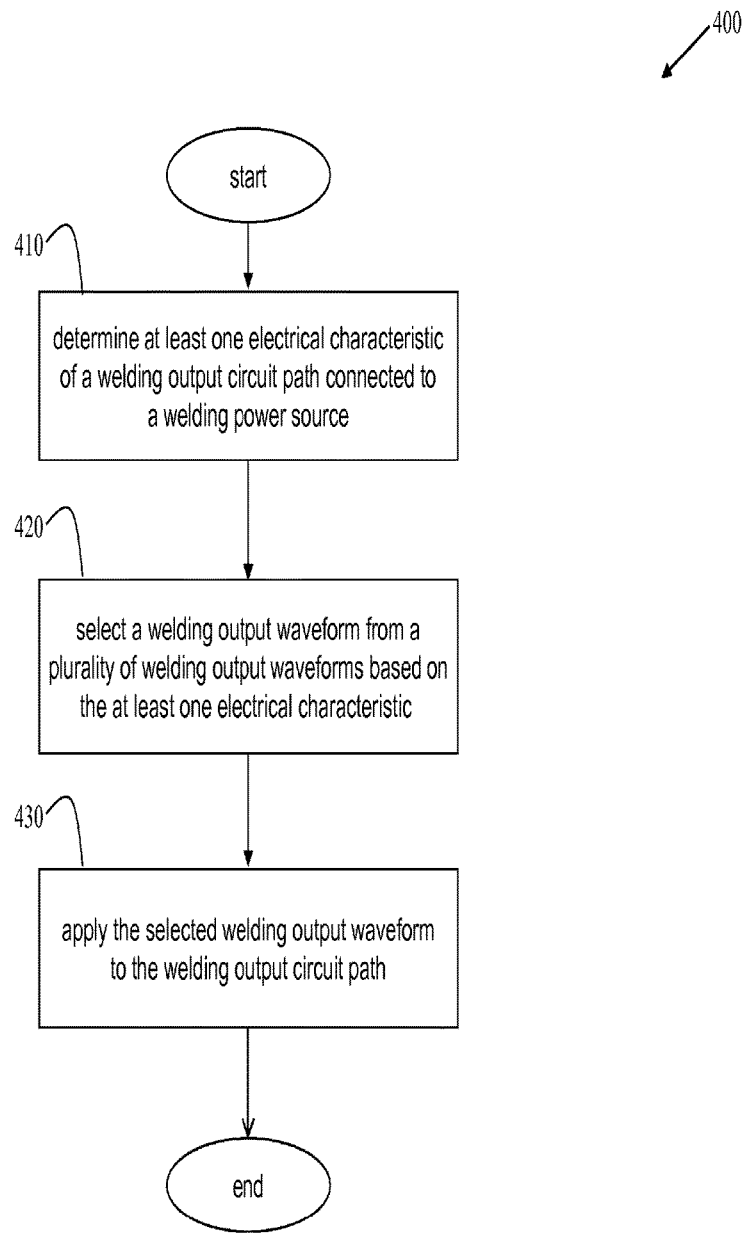
FIG. 4 is a flowchart of an exemplary embodiment of a method for matching a welding output waveform to a welding output circuit path.

FIG. 4 is a flowchart of an exemplary embodiment of a method 400 for matching a welding output waveform to a welding output circuit path. In step 410 of the method 400, at least one electrical characteristic of a welding output circuit path connected to a welding power source is determined. For example, the electrical characteristics may be determined automatically by the welding power source 110. In step 420 of the method 400, a welding output waveform is selected from a plurality of welding output waveforms based on the at least one electrical characteristic. For example, the welding output waveform may be selected automatically by the welding power source 110 using a look-up table or a state table. In step 430 of the method 400, the welding power source applies the selected welding output waveform to the welding output circuit path (for example, at the command of the user).

As an example, a user may desire to perform a welding operation with the system 100 of FIG. 1. The user may desire to perform a high switching speed welding operation, including implementing the method 400 of FIG. 4. The high switching speed welding operation is intended to switch from low output current levels to high output current levels in a welding output waveform, and vice versa, over relatively short intervals of time. For example, a welding power source may be configured to operate at a maximum switching speed of 1 kHz to facilitate such high speed current switching. However, the effective speed of switching (and the lengths of rise and fall times associated with the switching currents) may be limited by the electrical characteristics of the welding output circuit path 105.

In an ideal situation with unlimited rise and fall rates (e.g., having absolutely no inductance in the welding output circuit path), the welding output current may be able to change over a range of 3000 amps in one millisecond. However, in the real world, there are always some inductances and resistances associated with the welding output circuit path which limit the rise and fall times of the output current. For example, higher levels of resistance may be present due to frayed leads on a welding cable, an undersized welding cable, or a very long welding cable. The electrical characteristics of the welding output circuit path affect the characteristics of the resulting arc during welding which can affect the quality of the resulting weld.

Continuing with the example, the user may initially leave the welding power source 110 at a remote distance from the workpiece 140 and run a relatively long welding cable 120 from the welding power source 110 to the workpiece 140. The user selects a high switching speed welding process and the system 100 determines the electrical characteristics of the welding output circuit path 105. Due to the relatively long welding cable 120, the system 100 determines that the inductance and resistance are relatively high. Even though the user has selected a high switching speed welding process, the system 100 selects a first welding output waveform, from a plurality of possible welding output waveforms associated with the high switching speed welding process, that will work well with the relatively high inductance and resistance caused by the relatively long welding cable 120. That is, the switching speeds of the first selected welding output waveform are compatible with the rise time and fall time limits that the relatively high inductance and resistance of the welding output circuit path impose. As a result, the user proceeds to produce a first weld having acceptable quality.

Later, the user desires to weld another workpiece 140 which is located much closer to the welding power source 110. The user replaces the relatively long welding cable 120 with a much shorter welding cable. The user selects the same high switching speed welding process as before and the system 100 determines the electrical characteristics of the shorter welding output circuit path 105. The system 100 now determines that the inductance and resistance of the welding output circuit path are much lower than before, and the system selects a second welding output waveform, from the plurality of possible welding output waveforms associated with the high switching speed welding process, having higher switching speeds. That is, the switching speeds of the second selected welding output waveform are compatible with the faster rise and fall time limits that the relatively low inductance and resistance of the welding output circuit path impose.

As a result, the user proceeds to produce a second weld having certain quality characteristics that are even better than those of the first weld due to being able to take advantage of the higher switching speeds at the lower inductance and resistance levels.

In accordance with an embodiment, the determination of the electrical characteristics and the selection of the welding output waveforms are performed automatically by the welding power source 110, without the user having to think about it or do anything special.

In accordance with an embodiment of the present invention, the system may indicate to the user when an "inferior" welding output waveform has been selected, due to the limiting electrical characteristics of the welding output circuit path. Such an indication may be provided on a display 115 of the welding power source, for example. Furthermore, such an indication may incentivize the user to check and/or change the set up of the welding output circuit path. Also, there may be times when a user selects a welding process, or even a specific welding waveform, that is incompatible with the present welding output circuit path. In such a scenario, the system may provide an indication of the incompatibility to the user on a display 115 of the welding power source, incentivizing the user to select a new process or waveform, or change the set up of the welding output circuit path.

Figure 5:
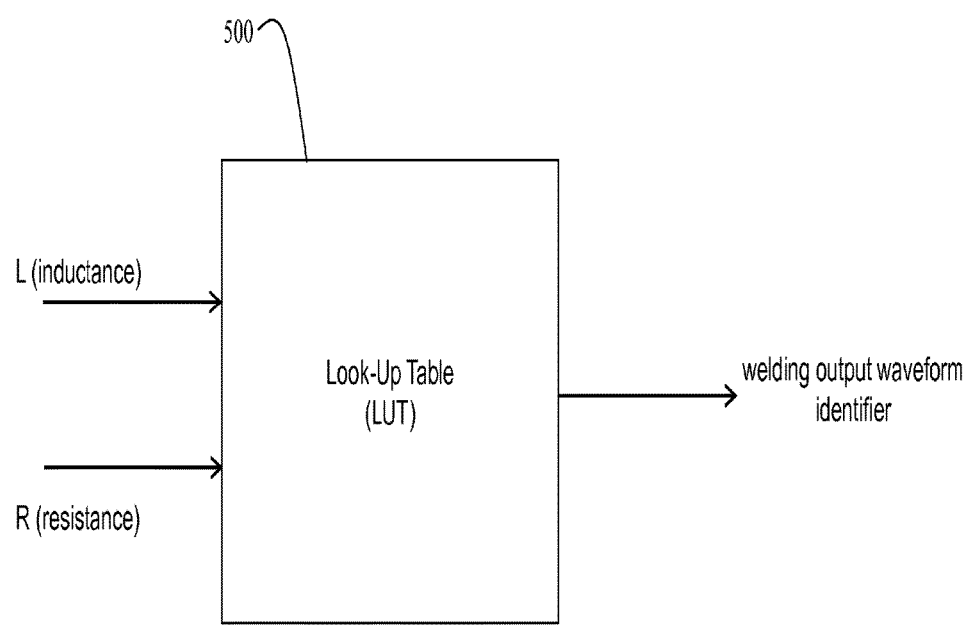
FIG. 5 illustrates a schematic block diagram of a look-up-table, in accordance with an embodiment of the present invention.

FIG. 5 illustrates a schematic block diagram of a look-up-table 500, in accordance with an embodiment of the present invention. The look-up table (LUT) 500 is implemented in the welding power source 110, in accordance with an embodiment and maps one or more inputs to an output. The inputs of the LUT 500 are the determined electrical characteristics (e.g., inductance and/or resistance) of the welding output circuit path 105, and the output is a welding output waveform, or waveform identifier that identifies a particular welding output waveform, of a plurality of welding output waveforms stored (e.g., in a computer memory) in the welding power source 110.

For example, a particular welding process or mode (e.g., a high switching speed process) may have ten welding output waveforms associated with it in the welding power source 110. A user may select a welding process and the welding power source 110 may automatically determine, via the LUT 500, the appropriate waveform to select from the ten waveforms, after automatically determining the electrical characteristics of a connected welding output circuit path 105. The LUT 500 is configured a priori to associate an appropriate waveform with a particular combination of inductance and resistance (or with a particular range of inductances and range of resistances).

In accordance with various embodiments, the LUT 500 may be implemented in hardware as, for example, an EEPROM, or in software as an addressable data structure stored in computer memory, for example. Other hardware and software constructs may be possible as well. In accordance with an embodiment of the present invention, the system 100 includes a plurality of LUTs 500. For example, the welding power source 110 may have one LUT for each welding process or welding mode provided by the welding power source 110.

Figure 6:
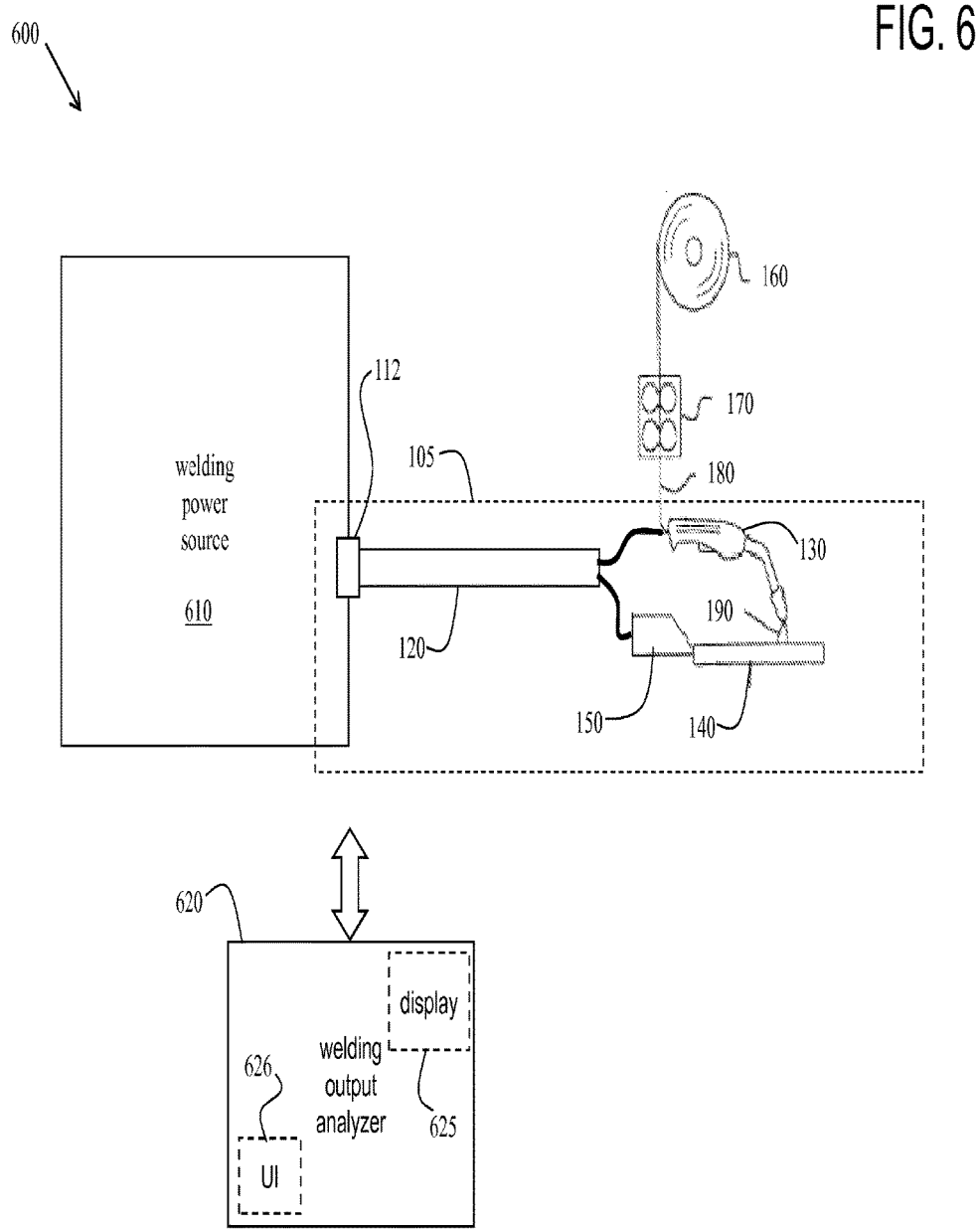
FIG. 6 illustrates a schematic block diagram of a second exemplary embodiment of a welding system including a welding output circuit path.

FIG. 6 illustrates a schematic block diagram of a second exemplary embodiment of a welding system 600 including a welding output circuit path 105. Similar to the system 100 of FIG. 1, the welding system 600 includes a welding power source 610 having a welding output 112. The welding output circuit path 105 is connected to the welding power source 610 at the welding output 112. The system 600 also includes a welding output analyzer 620. In accordance with an embodiment, the welding output analyzer 620 is a computer that operatively interfaces with the welding power source 610 and/or the welding output circuit path 105.

In the system 600 of FIG. 6, the functionality of determining the electrical characteristics of the welding output circuit path 105 and selecting a welding output waveform based on the determined electrical characteristics is implemented in the welding output analyzer 620. For example, the welding output analyzer 620 may command the welding power source 610 to apply welding output electrical parameters (e.g., regulated output voltages or currents) to the welding output circuit path 105 and measure the resulting welding output electrical parameters (e.g., output currents or output voltages). The welding output electrical parameters may be communicated from the welding power source 610 to the welding output analyzer 620 where the welding output analyzer 620 proceeds to compute the electrical characteristics (e.g., resistance and inductance) of the welding output circuit path 105 based on the welding output electrical parameters. In accordance with an alternative embodiment, the welding output analyzer 620 may monitor the welding output electrical parameters by direct measurement at the welding output circuit path 105, for example, via a high impedance interface and/or a current shunt.

The welding output analyzer 620, having a LUT 500, may then proceed to select an appropriate welding output waveform based on the computed electrical characteristics and communicate the selected welding output waveform to the welding power source 610. The welding power source 610 may then apply the selected welding output waveform to the welding output circuit path (for example, at the command of the user). In accordance with various embodiments, the electrical characteristics of the welding output circuit path may be determined automatically by the welding output analyzer 620, or in a manual manner with a user operating the welding output analyzer 620. For a manual scenario, the welding output analyzer 620 may optionally include a user interface 626 and/or a display 625 to aid the user.

In accordance with other alternative embodiments, the various functional aspects of determining the electrical characteristics of a welding output circuit path and selecting a welding output waveform based on the electrical characteristics may be distributed between the welding power source and the welding output analyzer in various ways, dependent on prudent design judgment, cost restrictions, and/or other considerations and tradeoffs.

In summary, systems and methods for selecting a welding output waveform based on characterizing a welding output circuit path with respect to its electrical characteristics are disclosed. At least one electrical characteristic (e.g., inductance, resistance) of a welding output circuit path connected to a welding power source is determined. A welding output waveform is selected from a plurality of welding output waveforms based on the determined electrical characteristics. As a result, the selected welding output waveform is matched to the welding output circuit path electrical characteristics to provide superior welding performance.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. § 112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A welding method comprising the steps of:
   estimating an inductance value of a welding output circuit path connected to a welding power source; and
   applying, by the welding power source, a welding output waveform to the welding output circuit path based upon the inductance value,
   wherein the welding output waveform is compatible with rise and fall time limits of the welding output circuit path.

2. The welding method of claim 1, further comprising the step of determining a resistance value of the welding output circuit path, wherein the welding output waveform applied to the welding output circuit path is further based upon the resistance value.

3. The welding method of claim 2, wherein the step of determining the resistance value includes applying a regulated voltage signal to the welding output circuit path.

4. The welding method of claim 2, wherein the step of determining the resistance value includes applying a regulated current signal to the welding output circuit path.

5. The welding method of claim 1, wherein the step of applying includes adjusting a welding output waveform switching speed based upon the inductance value.

6. The welding method of claim 1, wherein the welding power source automatically performs the step of estimating the inductance value of the welding output circuit path.

7. The welding method of claim 1, wherein the inductance value of the welding output circuit path is at least in part dependent on a welding cable in the welding output circuit path.

8. The welding system of claim 1, wherein the welding power source includes a look-up table that maps the inductance value to the welding output waveform.

9. A welding system, comprising:
   a welding power source having a welding output; and
   a welding output circuit path connected to the welding output,
   wherein the welding power source automatically estimates an inductance value of the welding output circuit path, and applies a welding output waveform to the welding output circuit path based upon the inductance value, and
   wherein the welding output waveform is compatible with rise and fall time limits of the welding output circuit path.

10. The welding power source of claim 9, wherein the welding power source determines a resistance value of the welding output circuit path, and applies the welding output waveform to the welding output circuit path based upon the resistance value.

11. The welding power source of claim 10, wherein the welding power source applies a regulated voltage signal to the welding output circuit path to determine the resistance value.

12. The welding power source of claim 10, wherein the welding power source applies a regulated current signal to the welding output circuit path to determine the resistance value.

13. The welding power source of claim 9, wherein the welding power source adjusts a welding output waveform switching speed based upon the inductance value.

14. The welding power source of claim 9, wherein the welding output circuit path includes a welding cable, and the inductance value of the welding output circuit path is at least in part dependent on a length of the welding cable.

15. The welding power source of claim 9, wherein the welding power source includes a look-up table that maps the inductance value to the welding output waveform.

16. A welding system, comprising:
a welding power source having a welding output; and
a welding output circuit path connected to the welding output, wherein the welding output circuit path includes a welding tool, and a welding cable extending between the welding output and the welding tool,
wherein the welding power source automatically estimates an inductance value of the welding output circuit path, and applies a welding output waveform to the welding output circuit path based upon the inductance value, and
wherein the welding output waveform is compatible with rise and fall time limits of the welding output circuit path.

17. The welding power source of claim 16, wherein the welding power source includes a look-up table that maps the inductance value to the welding output waveform.

18. The welding power source of claim 16, wherein the welding power source determines a resistance value of the welding output circuit path.

19. The welding power source of claim 16, wherein the welding power source applies a regulated voltage signal to the welding output circuit path to determine the resistance value.

20. The welding power source of claim 16, wherein the welding power source applies a regulated current signal to the welding output circuit path to determine the resistance value.

21. The welding power source of claim 16, wherein the welding power source adjusts a welding output waveform switching speed based upon the inductance value.

* * * * *